US010782414B2

(12) United States Patent
Rougerie et al.

(10) Patent No.: US 10,782,414 B2
(45) Date of Patent: Sep. 22, 2020

(54) GNSS RECEIVER WITH AN ON-BOARD CAPABILITY TO IMPLEMENT AN OPTIMAL ERROR CORRECTION MODE

(71) Applicant: CENTRE NATIONAL D'ETUDES SPATIALES, Paris (FR)

(72) Inventors: Sébastien Rougerie, Toulous (FR); Marion Roudier, Balma (FR); Lionel Ries, Viviers les Montagnes (FR); Laurent Lestarquit, Ramonville Saint Agne (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 1064 days.

(21) Appl. No.: 15/185,993

(22) Filed: Jun. 17, 2016

(65) Prior Publication Data

US 2016/0370466 A1 Dec. 22, 2016

(30) Foreign Application Priority Data

Jun. 19, 2015 (EP) .................................... 15305948

(51) Int. Cl.
| | |
|---|---|
| *G01S 19/07* | (2010.01) |
| *G06F 9/451* | (2018.01) |
| *G01S 19/43* | (2010.01) |
| *G01S 19/32* | (2010.01) |
| *G01S 19/39* | (2010.01) |

(Continued)

(52) U.S. Cl.
CPC .............. *G01S 19/07* (2013.01); *G01S 19/22* (2013.01); *G01S 19/25* (2013.01); *G01S 19/32* (2013.01); *G01S 19/33* (2013.01); *G01S 19/39* (2013.01); *G01S 19/41* (2013.01); *G01S 19/43* (2013.01);

(Continued)

(58) Field of Classification Search
None
See application file for complete search history.

(56) References Cited

U.S. PATENT DOCUMENTS

| 6,531,981 B1 | 3/2003 | Fuller et al. |
| 2007/0085737 A1 | 4/2007 | Eslinger et al. |

(Continued)

FOREIGN PATENT DOCUMENTS

WO 2014063584 A1 5/2014

OTHER PUBLICATIONS

WO2014063584 translation (Year: 2014).*

(Continued)

*Primary Examiner* — Whitney Moore
(74) *Attorney, Agent, or Firm* — Meagher Emanuel Laks Goldberg & Liao, LLP

(57) ABSTRACT

The invention discloses a receiver of GNSS positioning signals which has embedded computer logic to select between a first operating mode, which uses all available frequencies, and a second operating mode, which uses only part of the available frequencies but in combination with available correction data. The selection is based on a comparison of an index of quality of reception at the receiver and a computed or predicted precision/confidence level of the corrections. A plurality of corrections types are possible, including a type using a local model and a type using collaborative corrections. In some embodiments, a selection and/or a combination of a plurality of local models may be made to optimize the accuracy of the corrections.

22 Claims, 8 Drawing Sheets

(51) Int. Cl.
  *G01S 19/33* (2010.01)
  *G01S 19/22* (2010.01)
  *G01S 19/41* (2010.01)
  *G01S 19/25* (2010.01)
  *G06F 3/0484* (2013.01)
  *G06F 8/38* (2018.01)
(52) U.S. Cl.
  CPC .............. *G06F 3/0484* (2013.01); *G06F 8/38* (2013.01); *G06F 9/451* (2018.02)

(56) References Cited

U.S. PATENT DOCUMENTS

| | | |
|---|---|---|
| 2012/0019411 A1 | 1/2012 | Trautenberg |
| 2014/0009331 A1 | 1/2014 | Tominaga et al. |
| 2014/0187193 A1 | 7/2014 | Rudow et al. |

OTHER PUBLICATIONS

Gioia et al.: "Estimation of the GPS to Galileo time offset and its validation on a mass market receiver", 2014 7th ESA Workshop on Satellite Navigation Technologies and European Workshop on GNSS Signals and Signal Processing (NAVITEC), IEEE, pp. 1-6, Dec. 3, 2014.
Jakowski et al.: "Ionospheric range error correction models", Localization and GNSS (ICL-GNSS), 2012 International Conference on, IEEE, pp. 1-6, Jun. 25, 2012.
European Search Report and written opinion for 16305726.8, dated Mar. 2, 2017.
European Search Report for 15305948.0, dated Jan. 11, 2016.

* cited by examiner

GNSS RECEIVER WITH AN ON-BOARD CAPABILITY TO IMPLEMENT AN OPTIMAL ERROR CORRECTION MODE

FIELD OF THE INVENTION

The present invention applies to the field of satellite navigation. More specifically the invention allows a satellite navigation receiver to use error and correction models to improve the precision of a calculated position.

BACKGROUND

There are two Global Navigation Satellite Systems (GNSS) which have been fully deployed for a number of years (the US Global Positioning System, the Russian GLONASS) and two more which are under deployment (the Chinese Beidou Navigation Satellite System and the European Galileo system). These systems rely on the same principles: microwave radio signals are broadcast from a number of satellites which orbit in a non-geostationary orbit; the signals carry a code which is correlated with a local replica in a receiver configured to receive the broadcast signals; when a receiver is capable of acquiring and tracking signals from a minimum number of satellites (generally four), it is able to calculate its own position, velocity and time (PVT) from the pseudo-ranges of the satellites in view. Among the numerous sources of errors to which these calculations may be prone, one of the most important is the ionospheric error, which is due to ionization of the upper layers of the atmosphere which deviates the electromagnetic signals broadcast by the satellites.

Due at least in part to the ionospheric error, a standard single frequency GNSS receiver operating in a standalone non-aided mode will not achieve a positioning precision better than 10 meters, which is not acceptable for professional applications and less and less so even for consumer applications. There are a number of possibilities to mitigate the ionospheric error with the goal of improving precision by one to two orders of magnitude.

One of these possibilities is to use dual frequency receivers. However, these receivers are not very efficient in an environment where multipath signals bring significant noise, like the so-called "urban canyons" which include, for example, urban areas with high-rise buildings on multiple sides of a street, or when it is necessary to re-acquire the signals after a loss of sight, like when exiting a tunnel or a parking, or on a cold start.

Another type of approach has been developed, which consists of using corrections which are calculated using an external system, which can be satellite based or ground based. Satellite based corrections are calculated using a model and then broadcast by a specific satellite constellation (Satellite Based Augmentation System or SBAS). EGNOS belongs to this category. SBAS precision depends on the size of the elementary unit which is taken into account in the model. Currently, this precision is rather limited, and increasing it would be quite costly in terms of infrastructure. Ground based corrections use measurements made by ground reference stations. Real Time Kinematics or RTK systems belong to this category. The RTK approach offers a good precision in the vicinity of the reference stations, but this precision degrades rapidly when moving away from a reference station. Businesses and governmental institutions endeavor to develop networks of reference stations. But an acceptable precision in a vast area can only be achieved by adding reference stations at a high cost.

To improve on the performance of these types of systems, the assignee of the present invention has designed an inventive system, which was disclosed in French patent application filed under no FR14/58336. According to this invention, a number of contributing receivers collaborate to send GNSS channel data representative of code and phase of signals received on the channel, which are then processed by a server to determine atmospheric corrections to be applied in the area of the contributing receivers. Low precision receivers can benefit from precise corrections. But the precision of the corrections will depend on the density of the contributing receivers in the area for a defined period.

The different solutions of the prior art have all their advantages and drawbacks and there is therefore a need to be able to select the most efficient option at a moment in time, based on a model located on board the receiver and on an evaluation of at least the quality of reception of the receiver and the quality of service of available external aids.

SUMMARY OF THE INVENTION

It is an object of the invention to provide these improvements over the prior art.

It achieves this goal by providing a GNSS receiver capable of receiving at least two carriers at different frequencies and comprising an atmospheric correction model resident therein, said correction being updated by a computer logic receiving as input data representative of at least the quality of reception of the receiver and the quality of service of available external aids.

To this effect, the invention discloses a receiver of GNSS positioning signals, comprising: A) a plurality of signal processing channels configured for processing signals received from a plurality of satellites in GNSS constellations; B) a memory with a first database storing data usable to calculate atmospheric errors/corrections applicable to the receiver; C) computer logic configured for determining: i) a first parameter indicative of one of a quality of the signals received at the receiver, and a precision/confidence interval of a position calculated from an output of the plurality of signal processing channels; ii) a second parameter indicative of one of a present or predicted quality of the atmospheric corrections/errors, and a present or predicted precision/confidence interval of a position calculated from a combination of the output of the plurality of signal processing channels and the atmospheric errors/corrections calculated from the data in the first database; wherein the computer logic is further configured for triggering: i) a first operating mode of not combining the atmospheric errors/corrections calculated from the data in the first database with the output of the signal processing channels when the first parameter is better than the second parameter; ii) a second operating mode of combining the atmospheric corrections calculated from the data in the first database with the output of the signal processing channels when the first parameter is worse than or equal to the second parameter.

Advantageously, the receiver of the invention further comprises a local model to compute atmospheric errors/corrections of a first type which are stored in the first database.

Advantageously, the local model is a combination of one or more ionospheric errors correction models comprising Kobluchar or NeQuick models.

Advantageously, the combination includes the ionospheric errors correction model which outputs PVT data which are closest to the last available PVT data calculated in the first mode.

Advantageously, the combination includes a ionospheric errors correction model which is predefined as a function of one or more of a time or location.

Advantageously, the combination comprises all available models which output PVT data which are within a predefined confidence interval.

Advantageously, the combination is a weighted average.

Advantageously, the receiver of the invention further comprises a communication link to at least a satellite broadcasting atmospheric errors/corrections applicable in a geographic area where the receiver is located, said atmospheric errors/corrections being stored in a second database as atmospheric errors/corrections of a second type.

Advantageously, the receiver of the invention further comprises a communication link to a server connected to a third database of atmospheric errors/corrections of a third type calculated from a network of reference stations.

Advantageously, the receiver of the invention further comprises a communication link to a server connected to a fourth database of atmospheric errors/corrections of a fourth type, said server comprising hardware and software resources configured for: determining a list of contributing receivers located in a geographic area where the receiver is located; acquiring at a predetermined frequency, timed sequences of data transmitted by the contributing receivers in the list, said timed sequences of data comprising code and phase of a channel of each contributing receiver and/or a data computed thereof; calculating a timed sequence of atmospheric errors/corrections applicable in the geographic area; storing the timed sequence of atmospheric errors/corrections as atmospheric errors/corrections of the fourth type in the fourth database.

Advantageously, the first parameter is a normalized index representative of at least one of an intensity of multipath signals received at the receiver, a signal to noise ratio of the signals received at the receiver, an elevation of the satellites sending the signals processed by the signal processing channels and a difference of code and phase of the signals processed by the signal processing channels.

Advantageously, the second parameter is indicative of a predicted precision/confidence interval of a position calculated from a combination of the output of the plurality of signal processing channels and the atmospheric errors/corrections calculated from the data in the first database.

Advantageously, the first database is configured to be updated by one of a push and a pull from the second database, if a third parameter indicative of one of a present or predicted quality of the atmospheric errors/corrections of the second type and a present or predicted precision/confidence interval of a position calculated from a combination of the output of the plurality of signal processing channels and the atmospheric errors/corrections of the second type, is better than the second parameter.

Advantageously, the first database is configured to be updated by one of a push and a pull from the third database, if a fourth parameter indicative of one of a present or predicted quality of the atmospheric errors/corrections of the third type and a present or predicted precision/confidence interval of a position calculated from a combination of the output of the plurality of signal processing channels and the atmospheric errors/corrections of the third type, is better than the second parameter.

Advantageously, the first database is configured to be updated by one of a push and a pull from the fourth database, if a fifth parameter indicative of one of a present or predicted quality of the atmospheric errors/corrections of the fourth type and a present or predicted precision/confidence interval of a position calculated from a combination of the output of the plurality of signal processing channels and the atmospheric errors/corrections of the fourth type, is better than the second parameter.

The invention also discloses a method of processing GNSS positioning signals received at a receiver, comprising: A) receiving at the receiver a plurality of navigation signals from a plurality of satellites in GNSS constellations; B) accessing a first database to retrieve atmospheric errors/corrections applicable to the receiver; C) calculating: i) a first parameter indicative of one of a quality of the signals received at the receiver, and a precision/confidence interval of a position calculated from the plurality of navigation signals; ii) a second parameter indicative of one of a present or predicted quality of the atmospheric corrections/errors, and a present or predicted precision/confidence interval of a position calculated from the plurality of navigation signals and the atmospheric errors/corrections; D) triggering: i) a first operating mode of not combining the atmospheric errors/corrections with the navigation signals when the first parameter is better than the second parameter; ii) a second operating mode of combining the atmospheric corrections with the navigation signals when the first parameter is worse than or equal to the second parameter.

The invention also discloses a server for aiding users' receivers of GNSS positioning signals, said server comprising: A) an interface configured to acquire at least one of RTK and RTIGS atmospheric errors/corrections and a metrics of a confidence level of said errors/corrections; B) computer logic configured for: i) determining a list of contributing receivers located in a plurality of geographic areas; ii) acquiring at a predetermined frequency, timed sequences of data transmitted by the contributing receivers in the list, said timed sequences of data comprising code and phase of a channel of each contributing receiver and/or a data computed thereof; iii) calculating timed sequences of collaborative atmospheric errors/corrections applicable in the plurality of geographic areas and a metrics of a confidence level of said errors/corrections; D) a communication link configured for transmitting to the users' receivers at least one of the RTK, RTIGS and collaborative atmospheric errors/corrections with their associated metrics of a confidence level.

The invention also discloses a receiver of GNSS positioning signals, comprising: a plurality of signal processing channels configured for processing signals received from a plurality of satellites in GNSS constellations; a memory with a first database storing data usable to calculate atmospheric errors/corrections applicable to the receiver from a combination of one or more atmospheric errors/corrections models; computer logic configured for one of: i) calculating the combination as a best fit with a PVT calculated from reference signals that are one available at the receiver or have been available less than a predefined time span before; ii) selecting a predefined model stored in the first database, said selecting based on one or more of time or location; iii) filtering the one or more atmospheric errors/models to eliminate those that output PVT values outside a predefined confidence level and combining the models remaining at the output of the filtering.

Advantageously the reference signals are one of multi-frequencies signals and single frequency signals aided by atmospheric errors/corrections received from a GNSS augmentation system.

Advantageously, the local model is a combination of one or more ionospheric errors correction models comprising Kobluchar or NeQuick models.

Thanks to the invention, it is possible for a receiver to select the best operating mode at a moment in time. It is also possible to maintain a local model and a local database of the corrections to be applied and to update this model based on data provided by service providers.

In some embodiments, the invention allows to select/enrich/blend various local models adapted for specific GNSS constellations, such as the Klobuchar or the NeQuick models, possibly based on an optimization in view of the local conditions of reception of the GNSS signals.

BRIEF DESCRIPTION OF THE DRAWINGS

The invention will be better understood and its various features and advantages will become apparent from the description of various embodiments and of the following appended figures.

DETAILED DESCRIPTION

Figure 1:
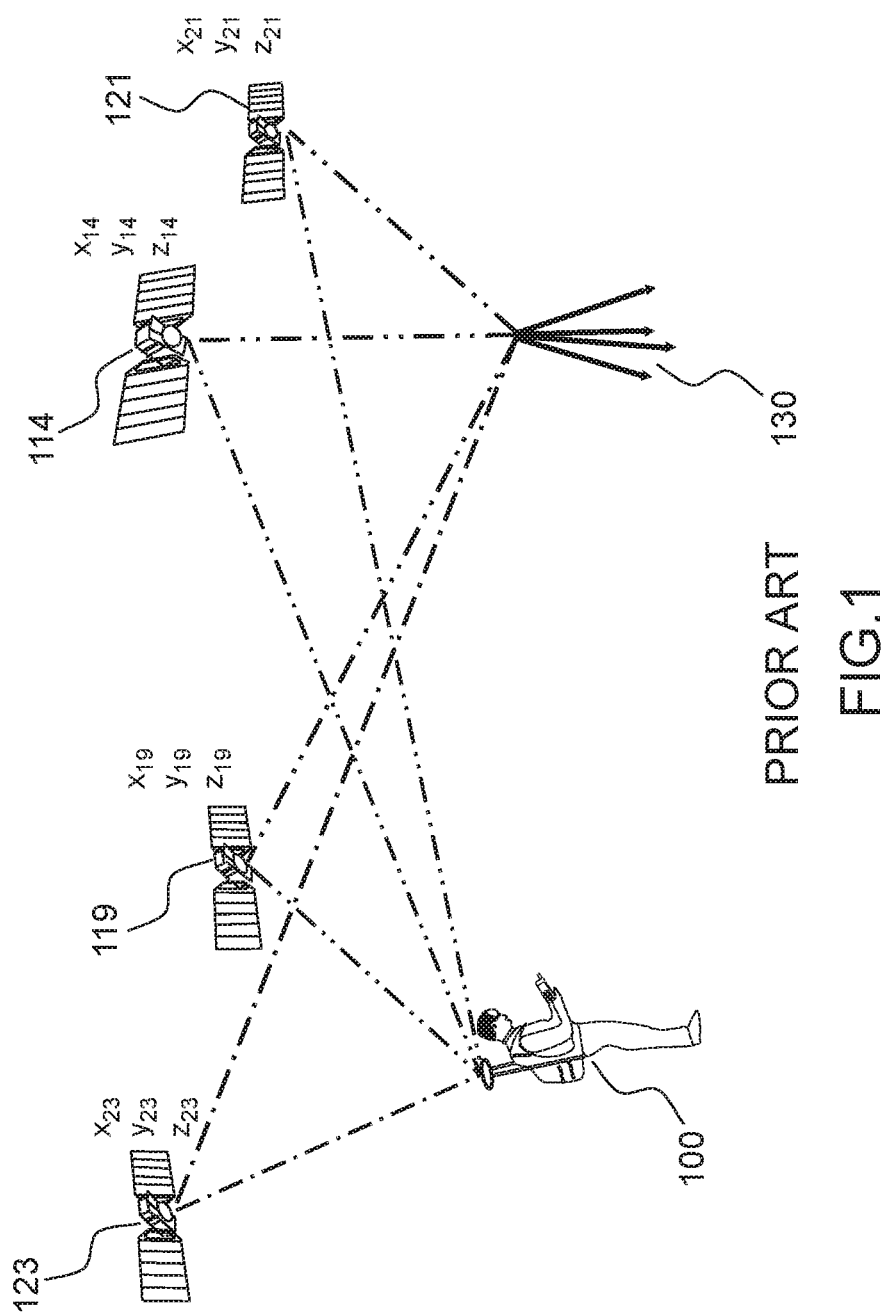
FIG. 1 represents a differential GNSS system of the prior art.

FIG. 1 represents a differential GNSS system of the prior art.

In a positioning system of a differential type, a user 100 receives positioning signals from at least a satellites constellation, 114, 119, 121, 123. The positioning signals from these satellites are also received by a reference station 130. The user 100 may be moving. The reference station 130 must have a position which is fixed, known with enough precision and located in a radius of 10 to 20 km from the user 100. (see for instance http://www.navipedia.net/index.php/RTK_Fundamentals).

An RTK algorithm can use the code or the phase of the navigation signal, or a combination of both, possibly with a variable weighting. Precision of a position calculation using the phase of the navigation signal is better, because it is less noisy, but the price to be paid is the complexity of solving the integer ambiguity of the measurement.

An RTK system can not only correct the atmospheric errors (ionosphere, troposphere), but also the clock errors. To resolve the phase ambiguity, which in the case of the L1 carrier of a GPS satellite is of the order of 20 cm for one cycle, double differences of the measurements of the RTK reference station 130 and of the user terminal 100 with two satellites are calculated.

Figure 2:
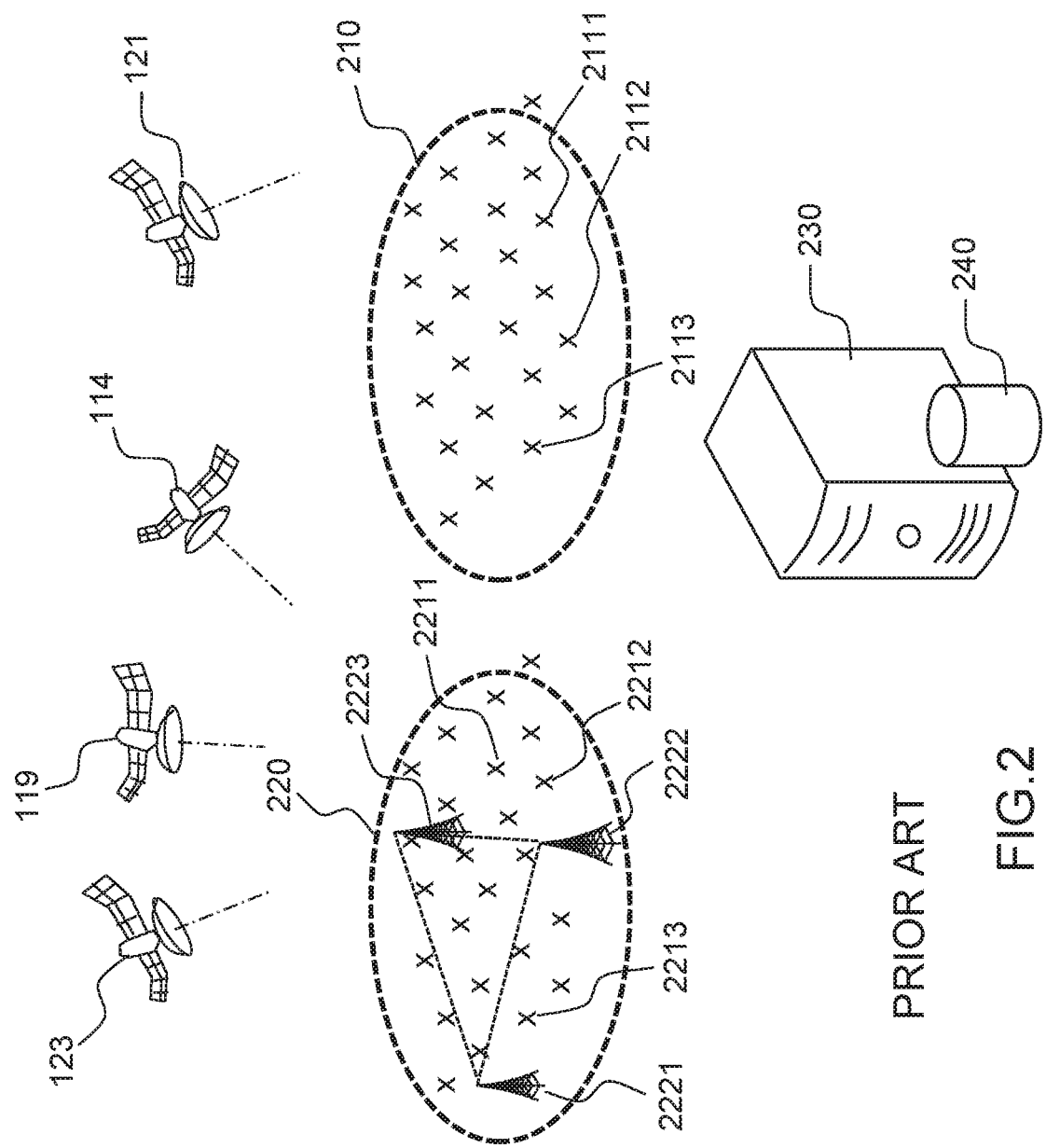
FIG. 2 represents a collaborative ionospheric correction system of the prior art.

FIG. 2 represents a collaborative ionospheric correction system of the prior art.

This system is disclosed by French patent application filed under no 14/58336 which is assigned to the assignee of the instant application. It uses the same satellites 114, 119, 121, 123 as those depicted in FIG. 1.

Geographic areas 210, 220 are defined where measurements of terminals/receivers 2111, 2112, 2113, 2211, 2212, 2213, which are operated in these geographic areas, contribute to a global calculation of ionospheric errors. Geographic areas 210, 220 have a typical mesh of a few kilometers (for instance between 1 and 10 km). A server 230 which is managed by a provider of positioning data 240 can receive data from the terminals and transmit data to them.

The terminals/receivers can be of any type, single or dual frequency, and capable of receiving signals from a single constellation or from a plurality of constellations. They can be, or not, equipped with antennas which are configured to mitigate the effects of multipath reflections. Their position calculation can be, or not, aided by an inertial hybridization or a map. They are coupled with a communication module to allow them to wirelessly transmit/receive data. For instance, simple smart phones having a standard GPS chip can be part of the system.

Receivers 2111, 2112, 2211, 2212 can by only <<contributing>> terminals, i.e. send data to the server 230, and/or to other receivers, the data being either raw code and phase data or pre-processed data, said raw or pre-processed data being used to calculate the ionospheric errors in the geographic areas 210, 220, without being "using" terminals, i.e. using the data.

Receivers 2113, 2213 can also be only <<using>> terminals, i.e. receive positioning data without contributing their own data to the system. Receivers can also be in turn, successively or simultaneously, "contributing" or "using".

Correction data are calculated by the server from the raw code and phase signals of the contributing receivers, or differences thereof. The correction data are associated with the positions of the contributing receivers which are transmitted with the code and phase data, or acquired independently, for instance using the telecom service provider data. The correction data can also be filtered using an index of quality.

Figure 3:
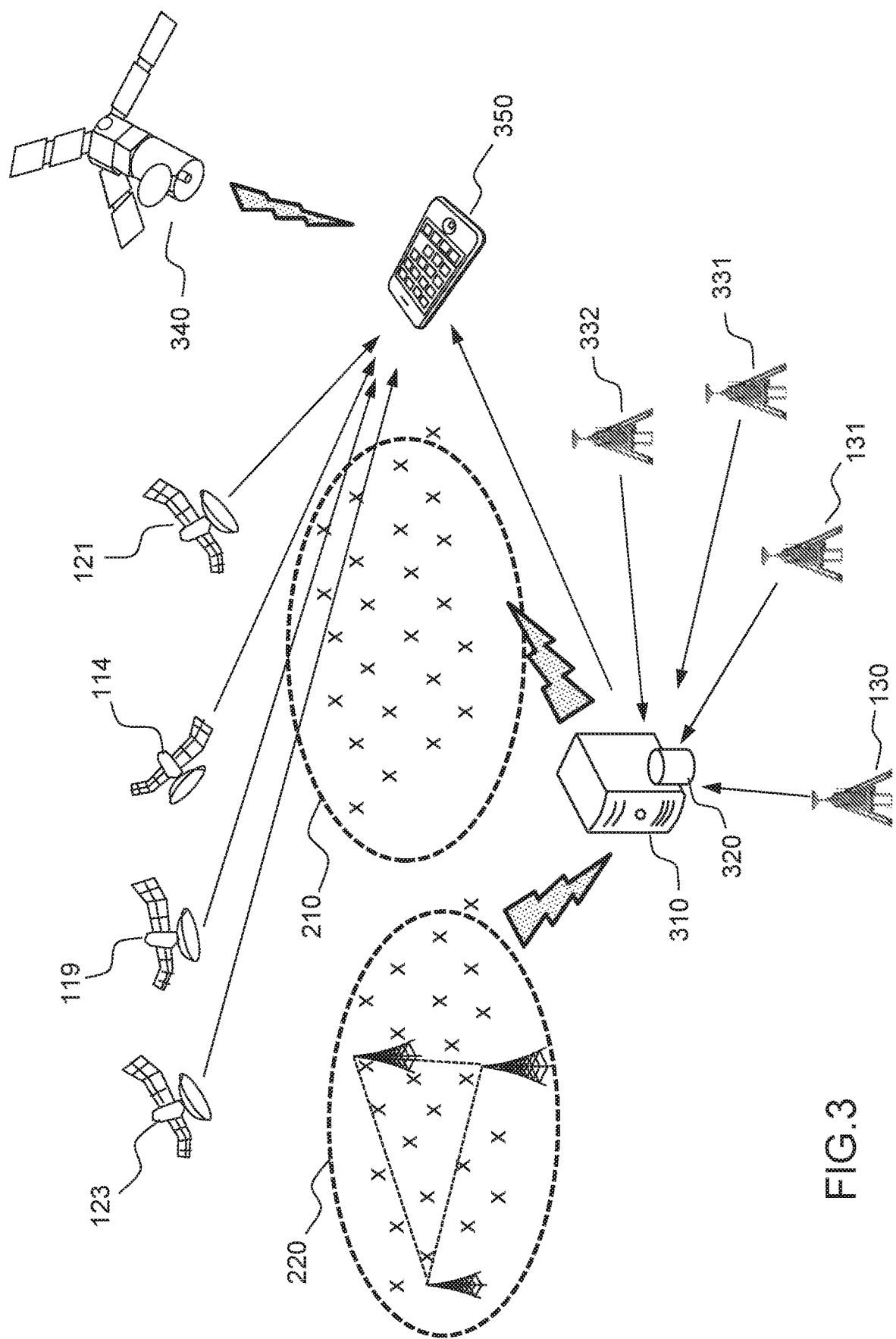
FIG. 3 represents a ionospheric correction system of the invention, according to a number of its embodiments.

FIG. 3 represents an ionospheric correction system of the invention, according to a number of its embodiments.

In a system according to the invention, signals from a number or satellites of one or more constellations, 114, 119, 121, 123, are received by terminals with a positioning capability in geographic areas 210, 220. A number of contributing terminals of the type discussed in relation to FIG. 2 above can be present and send their correction data to a server 310, which has an associated database, 320. Computer code instructions will be used to calculate correction data from the data received by the contributing receivers, as discussed above in relation to FIG. 2. The server will then distribute elaborated (i.e. with an index of confidence) correction data to user terminals, such as a terminal of the invention 350. The server and the database can be a physical or a virtual server and database, i.e. they can be embodied in a computer with its storage capabilities, or be a variable combination of hardware resources which are connected by the internet network. They will be managed by a provider of positioning data.

In the same geographic areas, 210, 220, a number of RTK reference stations 130, 131 of the type depicted on FIG. 1, can be present. RTIGS (Real Time International GNSS Service) 331, 332 can also be present. The RTK and RTIGS data can be used by server 310 to distribute position corrections to a user terminal 350.

The server 310 can also receive other types of data from sources to which it is connected, either by a wired link or wirelessly. These data may be correction data, or data which may be used to calculate position correction data, for instance meteorological actual or forecasted data, or geomagnetic interference data.

Other types of corrections can be transmitted directly to the terminal 350, for instance SBAS corrections of the EGNOS type, which are transmitted by geostationary satellite 340.

The terminal of the invention 350 has both a GNSS receiver capability and a wireless communication capability. The GNSS receiver capability comprises a plurality of signal processing channels. A signal processing channel processes the RF carrier code and phase signals received from a satellite in view. Possibly two or more RF carriers can be transmitted by a same satellite on two or more different frequencies. A dual frequency receiver can solve the integer phase ambiguities inherent to the navigation signals by calculating a single difference of the measurements at the two different frequencies. Therefore, a dual frequency receiver does not normally need to be provided with atmospheric corrections to achieve a precision of a 1 cm to 10 cm class. But this precision is very much degraded in an environment with significant multipath reflections, such as urban canyons. Also, dual frequency signals are more difficult than single frequency signals to re-acquire when exiting a zone where the signals were lost. Therefore, according to the invention, it is very advantageous, notably under these circumstances, for the terminal to be able to automatically switch to a single frequency mode, while being also able to generate locally or acquire from a remote site correction data to achieve a precision of the same order as the one provided by the processing of the signals from two or more frequencies.

Figure 4:
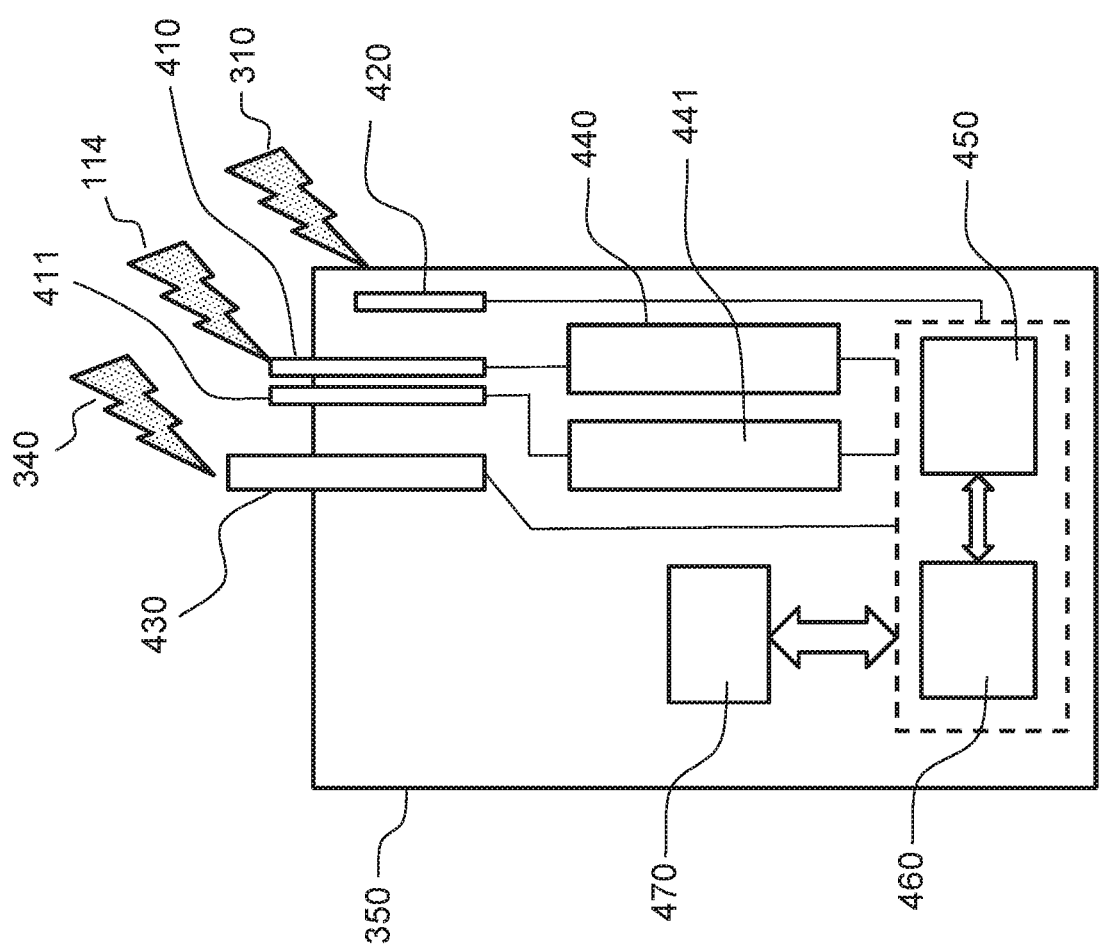
FIG. 4 represents a receiver for using the correction system of the invention, according to a number of its embodiments.

FIG. 4 represents a receiver for using the correction system of the invention, according to a number of its embodiments.

A terminal 350 according to the invention has antennas 410, 411 for acquiring signals from a plurality of satellites, for instance satellite 114, possibly on two or three frequencies (L1, L2, L5 for the GPS 3 constellation; E1, E2, E3 representing the E1, E5 and E6 frequencies of the Galileo constellation). It also has an antenna 420 for acquiring signals from server 310. The communication may use a cellular network (3G, 4G). In an option, the terminal also has an antenna 430 for acquiring signals from an SBAS satellite, for instance of the EGNOS type. In a further option, the information from the server 310 can be provided on the antenna 430. In another option, the SBAS signals and the server information can be acquired using the antennas 410, 411.

The terminal 350 also has a plurality of signal processing channels. The terminal may have two signal processing channels 440, 441 for processing signals from a same satellite 114. The terminal normally has more than two processing channels, to be able to process the signals of at least four satellites in view in parallel. Signal processing channels for a plurality of satellites in view are not represented on the figure.

A receiver of GNSS positioning signals of the prior art normally has computer logic configured to calculate a pseudo-range from the code signal modulating the satellite carrier and/or the phase of the carrier. The receiver is able to track the signals thanks to the use of correlation circuits of the received signals with local replicas and to calculate the pseudo-range for a satellite, possibly using a filtering algorithm of the Kalman type. The pseudo-ranges from the satellites in view are then blended in a PVT calculation module 470, which can also include a filter (not represented) and possibly an hybridization calculation module (not represented) with data from other positioning means (Inertial Navigation System, map, Radio Direction Finder, etc . . . ).

In a number of embodiments, a terminal 350 according to the invention is provided with a memory and computer logic, 450, 460.

The memory stores correction databases of different types. In a number of embodiments, it can also store a local model to compute atmospheric errors/corrections applicable to the receiver. The local model can be very simple, i.e. the model receives as input the pseudo-range received from one of the signal processing channels processing the signals of a satellite at one of the frequencies and adding to the pseudo-range the corrections stored in one of the databases. It can also be more complex. An example of complex local model is disclosed by Laurent Lestarquit, Norbert Suard, Jean-Luc Issler, "Determination of the Ionospheric Error Using Only LI Frequency GPS Receiver", ONES, 1997. In a model of this type, an observable model is included and estimation of errors and corrections is performed locally, which necessitates significant computing power and energy and introduces some latency. In an embodiment, the memory stores a first database comprising corrections of a first type, which are provided at the output of the local model. In an embodiment, the memory stores a second database comprising corrections of a second type, which are provided by an SBAS constellation. In an embodiment, the memory stores a third database comprising corrections of a third type, which are provided by the server 310 and are calculated using RTIGS or RTK reference stations. In an embodiment, the memory stores a fourth database, comprising corrections of a fourth type, which are also provided by the server 310 and are calculated from contributing receivers as explained in relation with FIG. 2.

In some embodiments, the memory can store only one or more of the databases of the second, the third and the fourth type, in combination with a database of the first type. These databases are preferably stored on the terminal, but in some embodiments, some or all of these databases can be stored in a database facility, identical to or different from the database 320 connected to the server 310. In some embodiments, the databases of the first, the second, the third and the fourth type can be formed by a single database facility, the different types of data, which differ by their origin, being only identified by a field in the single database.

The computer logic is configured to decide if the pseudo-range and/or the PVT should be calculated only based on the output of the signal processing channels 410, 411 (plus others) or, at least in part, from the output of one of the correction databases. This decision is based on an evaluation of a number of parameters, as will be discussed further down in the description.

When a plurality of types of correction data is available, the computer logic is also configured to decide which one should be used to update the local database and/or the local model, based also on a number of parameters.

The computer logic may also be configured to update the local database with the uncorrected output from the signal processing channels.

The computer logic can be entirely resident on the terminal, or it may also comprise lines of codes or procedures which will invoke other procedures which are stored remotely, for instance on the database 320.

Figure 5:
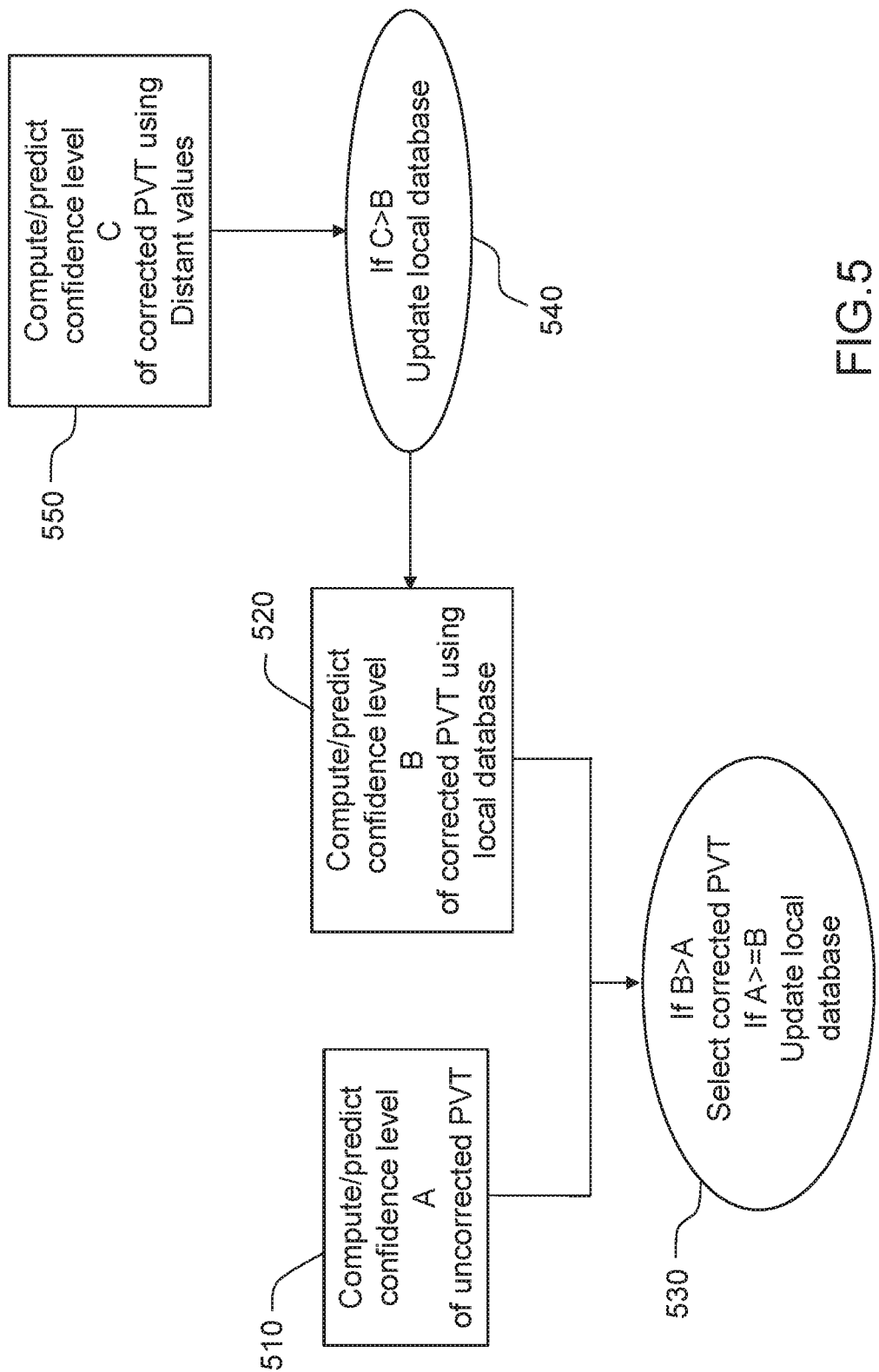
FIG. 5 displays a general flow chart of the invention, according to a number of its embodiments.

FIG. 5 displays a general flow chart of the invention, according to a number of its embodiments.

In a routine 510, a first parameter A is calculated.

This first parameter may be indicative of a quality of the signals received by the receiver. The quality of the signals received by the receiver can be measured by an intensity of multipath signals received at the receiver. A high intensity is indicative of a situation where a receiver operating in a multi-frequency mode may not give the best results and where it may be preferable to use a single frequency mode aided by atmospheric corrections. Another indication of a quality of the signals received at the receiver is an elevation above the horizon of the satellite transmitting the said signals. Indeed, the elevation will in some instances be correlated with the intensity of multipath reflections. Yet, another indication of a quality of the signals received at the receiver is a difference between the code and phase signals. A high value will be indicative of a significant atmospheric error, which needs to be corrected. Yet, another classical indication of a quality of the signals received at the receiver is a signal to noise ratio. Advantageously, the first parameter will be a normalized index, with a value centered at 100, for signals of an average quality, values above 100 having an above average quality, and values below 100 having a below average quality. If the quality measured by the index has a non-linear behavior, it will be advantageous to use a transformed index which will be linear.

The first parameter may also be indicative of a precision or of a confidence interval of a pseudo-range or a position of the receiver calculated from an output of the plurality of signal processing channels 440, 441.

A precision or a confidence interval can be calculated directly at the output of the signal processing channel, possibly as a value derived from the index of quality. Also, a precision or a confidence interval can be predicted based on a number of parameters, like the configuration of the GNSS constellations at the site of reception, or the hardware and software configuration of the receiver. A method to predict a confidence interval is disclosed by French patent application no FR14/58862. Such prediction will depend on the kind of processing of the signal processing channels, the antennas, the constellations that it is possible to acquire, etc . . . . This confidence interval should also be normalized around a central value of 100.

Any of the indices of quality of the received signals and the confidence interval can be selected to calculate the first parameter A. A combination of the two can also be selected without departing from the scope of the invention. Since a smaller confidence interval is a token of a better confidence, while a higher value of an index of quality is a token of a better quality, the adjective "better" will be used to qualify the two properties by a single word. Symmetrically, the adjective "worse" will be used to qualify the two properties of a larger confidence interval which is a token of a confidence which is worse and of a lower index of quality.

The calculation of the quality of the received signals and of the confidence interval can be performed in two operating modes, one using all frequencies of the navigation signals received by the terminal and one not using all available frequencies, for instance a single frequency only. The result of the calculation in the first operating mode is a first parameter, denoted A. The result of the calculation in the second operating mode may be used in the calculation of the B second parameter which is explained below. The "better" and "worse" qualifiers will be used with the same meaning for the second parameter as for the first parameter, as explained above.

A confidence interval of a calculation of a position of the receiver using the corrections of the first database is also computed as a second parameter B at step 520. This second parameter measures the quality of reception of the receiver operating at a single frequency (or at less frequencies than available) and using one of the corrections which are available. Various types of corrections can be used as will be explained in relation with FIG. 7. But at a moment in time, only one type of correction is available in the first database, because it has been determined at a previous moment that this type of correction was better than the data previously present in the first database. B is also a normalized index.

At a step 530, the values of A and B are compared. If A>=B, a first operating mode using all frequencies available at the receiver is selected by the computer logic. If not, the second operating mode of the receiver is selected, and the corrections are applied to the pseudo-range/PVT measurements. In the first operating mode, the first database is updated with the values of the pseudo-range and/or PVT position of the receiver calculated in this first operating mode.

In some embodiments, the first database may be updated with corrections from the server at a step 540. This update is performed if a confidence level C of the distant corrections, which is computed at a step 550, is better than the confidence level of the measurements/corrections in the first database. The method to calculate confidence level C is explained further down in the description.

Figure 6:
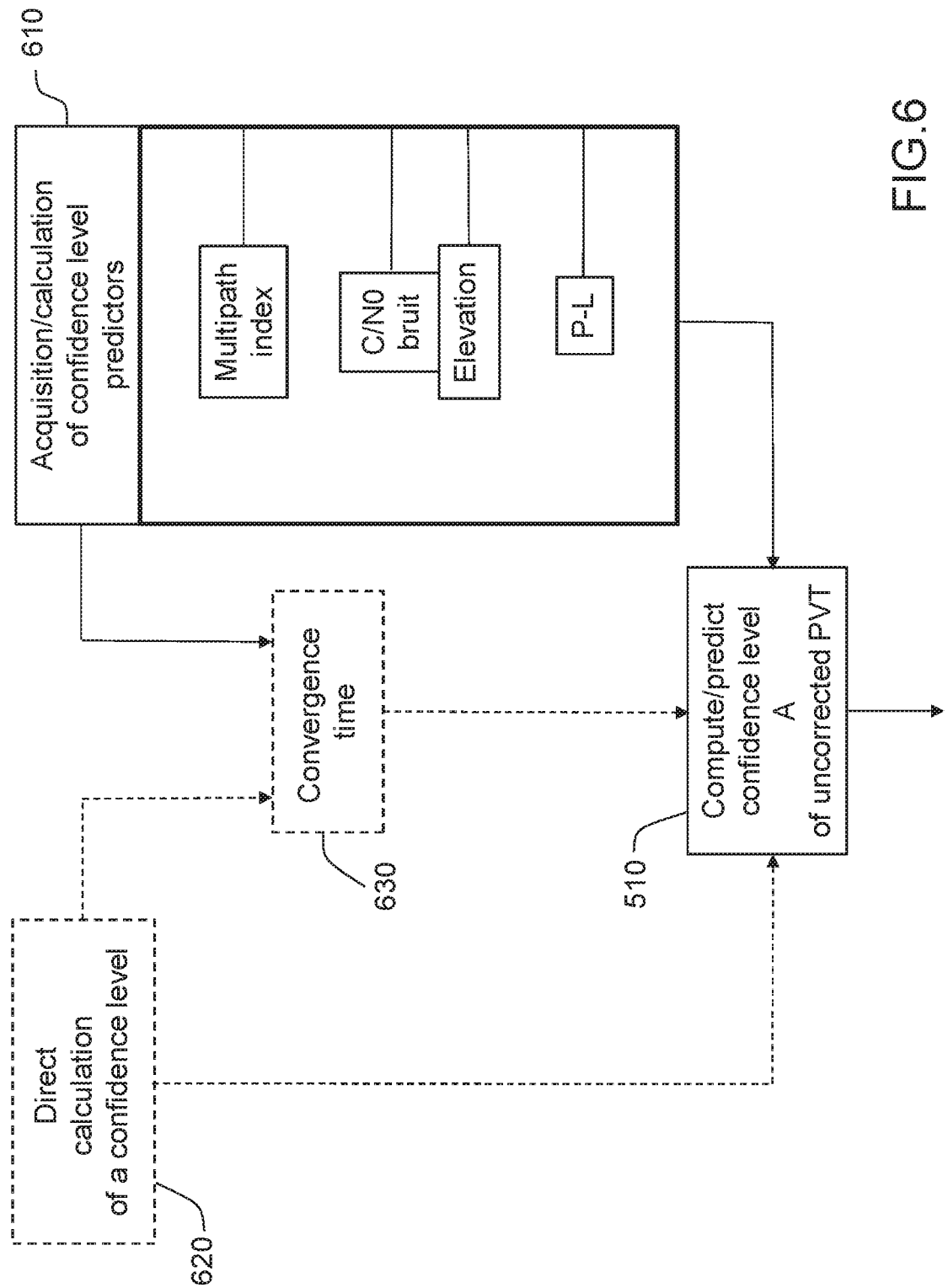
FIG. 6 displays a developed detail of the general flow chart of FIG. 5.

FIG. 6 displays a developed detail of the general flow chart of FIG. 5.

The figure gives more details on step 510 of FIG. 5. The 610 branch groups the various quality indexes, the details of which have already been explained above. The quality index can be considered as a predictor of the precision or confidence level. The 620 branch represents the direct calculation of a precision or a confidence level, which was also explained. As an option, it is also possible to calculate/predict a convergence time as a by-product of the calculation of the quality index. At an optional step 630, this convergence time may be input in the calculation of the final confidence level A. The decision can be made to use a second corrected operating mode instead of the first multi-frequency operating mode, even when the raw first parameter A is better than B, but when the convergence time is better with the single frequency corrected second operating mode, which is often the case, especially when the signals have to be re-acquired after exiting a tunnel, a parking or another black area, or on a cold start.

Figure 7:
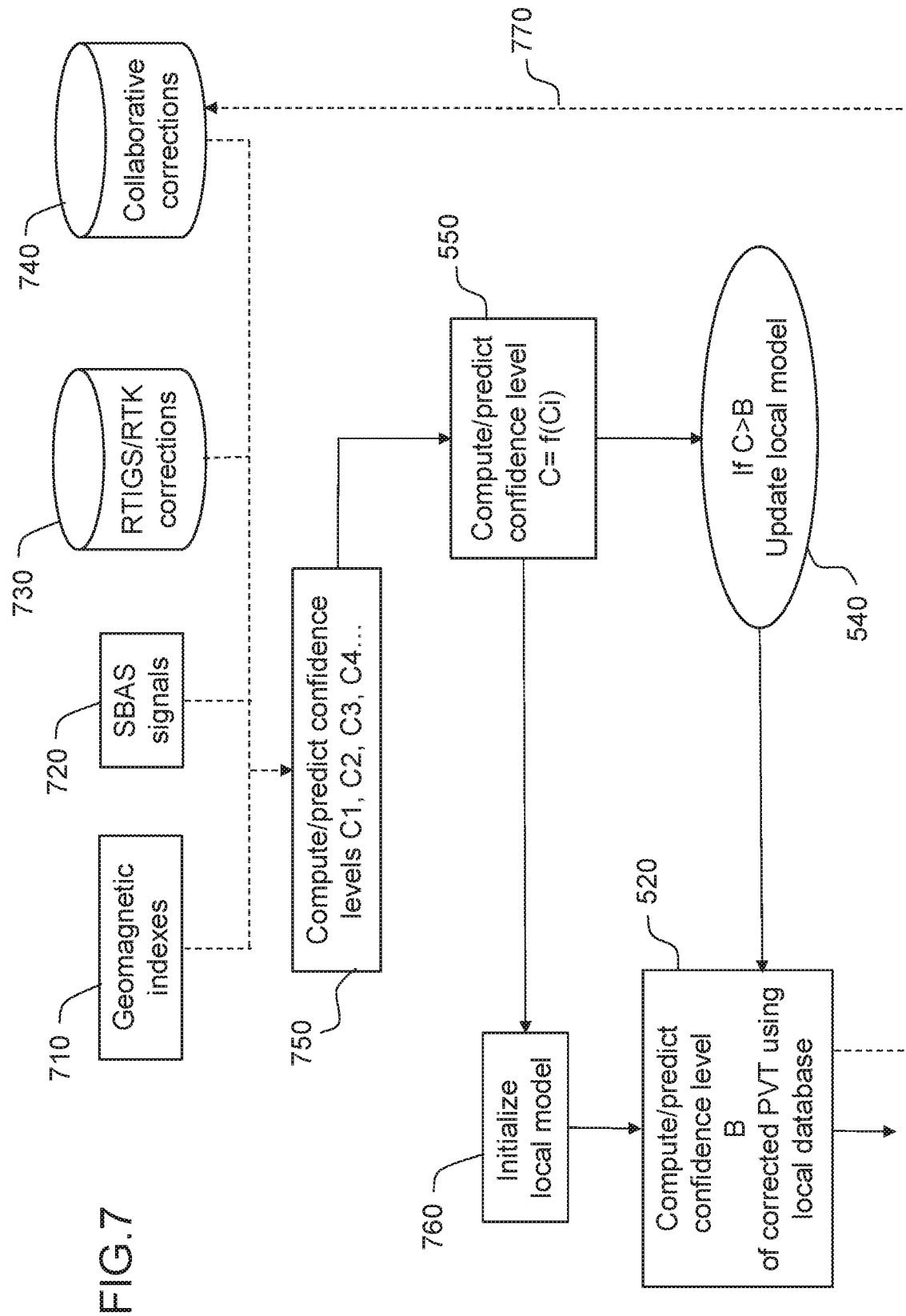
FIG. 7 displays another developed detail of the general flow chart of FIG. 5.

FIG. 7 displays another developed detail of the general flow chart of FIG. 5.

Different types of corrections may be accessible through the server 310 or through a satellite link of the GNSS receiver. Corrections of the second type, 720, may be SBAS corrections (accessible through a satellite link). Other SBAS corrections may also as well be available from server 310. Corrections of a third type, 730, may be RTK/RTIGS corrections, which are normally accessible through the server 310. Corrections of a fourth type, 740, may be collaborative corrections. They are generated by the server from a list of contributing receivers located in the same geographic area as the receiver of the user. Corrections can also be of other types, for instance geomagnetic indexes is an indicator of the ionospheric conditions. These indexes may be used in combination with the corrections of the other types, to possibly modify the corrections which would normally be applicable, because the geomagnetic index shows that the ionospheric condition is not standard, for instance in case of a presence of ionospheric scintillation. Likewise for meteorological conditions, for instance in case of a cloudy condition. Or these corrections may be evaluated separately and fed to the local model if they yield a better confidence level than the other corrections. In some embodiments, only part, not all, of these possible corrections may be available.

Confidence levels C1, C2, C3, C4, etc . . . are calculated (step 750) for all available corrections, using the same procedure as for the corrections of the first type (local model), and the confidence level of the PVT calculation. Step 750 can be a substitute of step 550. In this case, the confidence level of each type of available correction is compared to the values the confidence levels of the corrections/errors in the first database. As an option, step 550 may be an additional step, using a function of all the previously calculated confidence levels Ci, f(Ci). This function can for instance be an instantaneous maximum, or a maximum on a time window, said time window being chosen either on the past or at least partly on a forward looking time horizon.

The resulting parameters (third, fourth, fifth, etc . . . ) or resulting parameter (third), C1, C2, C3, C4 . . . or C, are then compared to the second parameter B to decide if the local data will be improved by an outside correction.

The local model needs to be initialized at a step 760. One way of doing so is to select the best corrections available on the remote server.

Also the method of the invention can be integrated with the method disclosed in French patent application no FR14/58862, at step 770, with data collected from the first database being sent to the server 310 to be merged in the process of calculating collaborative corrections.

Figure 8:
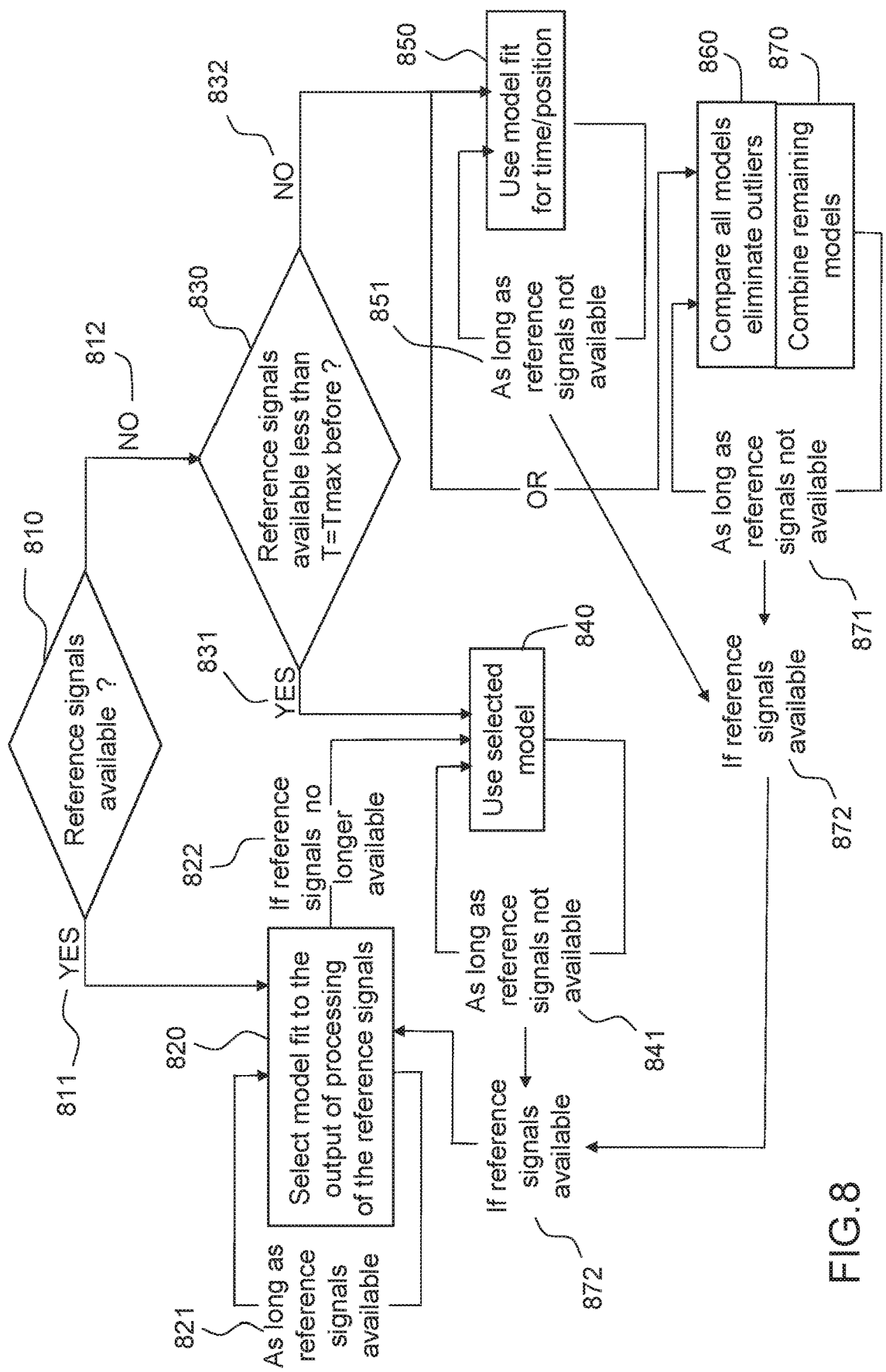
FIG. 8 displays a flow chart of embodiments of the invention wherein an optimized local model is selected/adapted in view of the local conditions of reception.

FIG. 8 displays a flow chart of embodiments of the invention wherein an optimized local model is selected/adapted in view of the local conditions of reception.

According to these embodiments of the invention, reference signals may be multiple frequencies signals from one or more GNSS constellations. They may also be single frequency signals from one or more GNSS constellations, aided by SBAS corrections or other corrections. More and more GNSS receivers are now available with a capacity to receive and process navigation signals from a plurality of constellations, It should be noted that these corrections have good availability in some regions because they are broadcasted by satellites navigating on geostationary orbits. They have though an accuracy which is limited to 50 to 80% of the total ionospheric error. such as GPS, Glonass, Beidou, Galileo or other constellations with a local coverage.

Ionospheric error correction models have been developed and parameterized to be tuned for some of these constellations. The two most renowned models are the Klobuchar and the NeQuick models. The Klobuchar model is used for correcting the ionospheric errors affecting the GPS navigation signals.
(http://www.navipedia.net/index.php/Klobuchar_Ionospheric_Model)

The NeQuick model is used for correcting the ionospheric errors affecting the Galileo navigation signals.
(http://www.navipedia.net/index.php/NeQuick_Ionospheric_Model)

According to these embodiments of the invention, the reference signals which are available for a defined configuration of a receiver at a moment in time may be the multiple frequencies signals or the single frequency signals of a defined constellation, corrected by SBAS corrections or the local model adapted to this constellation. The corrections may be available from the second database an the corrections of the local model from the first database. Available reference signals means that the reference signals are present or that they have a confidence index which is higher than a preset value (first parameter for the multi-frequency signals, second parameter for corrected signals, as discussed above).

According to these embodiments, when a single frequency carrier is available, the raw data for this carrier for each satellite of each constellation is acquired. The raw data are then corrected using the corrections adapted to their constellation of origin. A quality indicator may be computed. This allows a comparison of the confidence intervals of all measurements. The signals giving the best quality indicator may be chosen as reference signals. The raw data may also be calculated using signals corrected using a blend of models, and not only the model used for the reference signals. The blending method may be made time and/or location dependent. It may also be tuned using some kind of artificial intelligence technique, such as neural networks.

By way of example only, such a method according to one of these embodiments may be performed based on a flow chart identical or similar to the flow chart displayed on FIG. 8.

A test is made 810 of whether the reference signals are available or not. If they are, branch 811 is executed. If not, branch 812 is executed.

In branch 811, the model which outputs a PVT that is closest to the last PVT available from the reference signals is selected 820 as long as the reference signals are available 821. Again, available may mean available at a moment in time, or available at all.

In branch 812, a test 830 is executed of the freshness of the last reference signals which were available (T<=Tmax). If the test is positive 831 the last available best model is used 840 as long as the reference signals are not available, 841. If the test is negative 832, as a first option, a predefined model stored with time and/or location of usage is selected to be used 850 as long as the reference signals are not available, 851. As a second option, confidence levels or quality indexes of all available models may be compared 860. Values out of defined boundaries (outliers) may be eliminated. The results of the remaining models may be then combined at step 870, as long as the reference signals are not available, 871. Combination may for instance, be a weighted average, the weights being possibly calculated dynamically as a function of confidence levels and/or quality indexes. Weights may be calculated in such a way that, at a moment in time, a single model is selected because it is designated by the quality index as the best. Confidence levels and quality indexes may be calculated as explained above in the description.

The two branches 811 and 812 may be linked both ways by logical connections 822, 842, 872 when the availability of the reference signals changes.

As an option of these embodiments, it is possible that availability of the reference signals is switched on/off based on a control parameter. A control parameter may be a simple predetermined period of time. It may be an index of power level to allow control of power consumption of the receiver. It may be a level of multipath reflections: as explained above, multi-frequency signals are more affected than single frequency signals by multipath.

These embodiments of the invention may be implemented in a stand alone manner, or combined with other embodiments.

The examples disclosed in this specification are only illustrative of some embodiments of the invention. They do not in any manner limit the scope of said invention which is defined by the appended claims.

The invention claimed is:

1. A receiver of GNSS positioning signals, comprising:
   a plurality of signal processing channels configured for processing signals received from a plurality of satellites in GNSS constellations;
   a memory with a first database storing data usable to calculate atmospheric errors/corrections applicable to the receiver;
   computer logic configured for determining:
      a first parameter indicative of one of a quality of the signals received at the receiver and a precision/confidence interval of a position calculated from an output of the plurality of signal processing channels;
      a second parameter indicative of one of a present or predicted quality of the atmospheric corrections/errors and a present or predicted precision/confidence interval of a position calculated from a combination of the output of the plurality of signal processing channels and the atmospheric errors/corrections calculated from the data in the first database;
   wherein the computer logic is further configured for triggering: i) a first operating mode of not combining the atmospheric errors/corrections calculated from the data in the first database with the output of the signal processing channels when the first parameter is better than the second parameter; ii) a second operating mode of combining the atmospheric corrections calculated from the data in the first database with the output of the signal processing channels when the first parameter is worse than or equal to the second parameter.

2. The receiver of claim 1, further comprising a local model to compute atmospheric errors/corrections of a first type which are stored in the first database.

3. The receiver of claim 2, wherein the local model is a combination of a plurality of ionospheric errors correction models comprising Kobluchar or NeQuick models.

4. The receiver of claim 3, wherein the combination includes the ionospheric errors correction model which outputs PVT data which are closest to the last available PVT data calculated in the first mode.

5. The receiver of claim 3, wherein the combination includes an ionospheric errors correction model which is predefined as a function of one or more of a time or location.

6. The receiver of claim 3, wherein the combination comprises all available models which output PVT data which are within a predefined confidence interval.

7. The receiver of claim 6, wherein the combination is a weighted average.

8. The receiver of claim 1, further comprising a communication link to at least a satellite broadcasting atmospheric errors/corrections applicable in a geographic area where the receiver is located, said atmospheric errors/corrections being stored in a second database as atmospheric errors/corrections of a second type.

9. The receiver of claim 1, further comprising a communication link to a server connected to a third database of atmospheric errors/corrections of a third type calculated from a network of reference stations.

10. The receiver of claim 1, further comprising a communication link to a server connected to a fourth database of atmospheric errors/corrections of a fourth type, said server comprising hardware and software resources configured for:
    Determining a list of contributing receivers located in a geographic area where the receiver is located;
    Acquiring at a predetermined frequency, timed sequences of data transmitted by the contributing receivers in the list, said timed sequences of data comprising:
        Code and phase of a channel of each contributing receiver; and/or
        A data computed thereof;
    Calculating a timed sequence of atmospheric errors/corrections applicable in the geographic area;
    Storing the timed sequence of atmospheric errors/corrections as atmospheric errors/corrections of the fourth type in the fourth database.

11. The receiver of claim 1, wherein the first parameter is a normalized index representative of at least one of an intensity of multipath signals received at the receiver, a signal to noise ratio of the signals received at the receiver, an elevation of the satellites sending the signals processed by the signal processing channels and a difference of code and phase of the signals processed by the signal processing channels.

12. The receiver of claim 1, wherein the second parameter is indicative of a predicted precision/confidence interval of a position calculated from a combination of the output of the plurality of signal processing channels and the atmospheric errors/corrections calculated from the data in the first database.

13. The receiver of claim 1, wherein the first database is configured to be updated by one of a push and a pull from the second database, if a third parameter indicative of one of a present or predicted quality of the atmospheric errors/corrections of the second type and a present or predicted precision/confidence interval of a position calculated from a combination of the output of the plurality of signal processing channels and the atmospheric errors/corrections of the second type, is better than the second parameter.

14. The receiver of claim 1, wherein the first database is configured to be updated by one of a push and a pull from the third database, if a fourth parameter indicative of one of a present or predicted quality of the atmospheric errors/corrections of the third type and a present or predicted precision/confidence interval of a position calculated from a combination of the output of the plurality of signal processing channels and the atmospheric errors/corrections of the third type, is better than the second parameter.

15. The receiver of claim 1, wherein the first database is configured to be updated by one of a push and a pull from the fourth database, if a fifth parameter indicative of one of a present or predicted quality of the atmospheric errors/corrections of the fourth type and a present or predicted precision/confidence interval of a position calculated from a combination of the output of the plurality of signal processing channels and the atmospheric errors/corrections of the fourth type, is better than the second parameter.

16. A method of processing GNSS positioning signals received at a receiver, comprising:
    receiving at the receiver a plurality of navigation signals from a plurality of satellites in GNSS constellations;
    accessing a first database to retrieve atmospheric errors/corrections applicable to the receiver;
    calculating:
        a first parameter indicative of one of a quality of the signals received at the receiver, and a precision/confidence interval of a position calculated from the plurality of navigation signals;
        a second parameter indicative of one of a present or predicted quality of the atmospheric corrections/errors, and a present or predicted precision/confidence interval of a position calculated from the plurality of navigation signals and the atmospheric errors/corrections;

triggering:
a first operating mode of not combining the atmospheric errors/corrections with the navigation signals when the first parameter is better than the second parameter;
a second operating mode of combining the atmospheric corrections with the navigation signals when the first parameter is worse than or equal to the second parameter.

17. A system comprising:
a plurality of receivers of GNSS signals, wherein each of the plurality of receivers of GNSS signals comprises:
a plurality of signal processing channels configured for processing signals received from a plurality of satellites in GNSS constellations;
a memory with a database storing data usable to calculate atmospheric errors/corrections applicable to the receiver;
computer logic configured for determining:
a first parameter indicative of one of a quality of the signals received at the receiver and a precision/confidence interval of a position calculated from an output of the plurality of signal processing channels;
a second parameter indicative of one of a present or predicted quality of the atmospheric corrections/errors and a present or predicted precision/confidence interval of a position calculated from a combination of the output of the plurality of signal processing channels and the atmospheric errors/corrections calculated from the data in the first database;
wherein the computer logic is further configured for triggering: i) a first operating mode of not combining the atmospheric errors/corrections calculated from the data in the first database with the output of the signal processing channels when the first parameter is better than the second parameter, ii) a second operating mode of combining the atmospheric corrections calculated from the data in the first database with the output of the signal processing channels when the first parameter is worse than or equal to the second parameter; and
a server comprising:
an interface configured to acquire at least one of Real Time Kinematics (RTK) and Real Time International GNSS Service (RTIGS) atmospheric errors/corrections and a metrics of a confidence level of said errors/corrections;
computer logic configured to
determine a list of contributing receivers located in a plurality of geographic areas;
acquire at a predetermined frequency, timed sequences of data transmitted by the contributing receivers in the list, said timed sequences of data comprising:
Code and phase of a channel of each contributing receiver; and/or
A data computed thereof;
calculate timed sequences of collaborative atmospheric errors/corrections applicable in the plurality of geographic areas and a metrics of a confidence level of said errors/corrections from the timed sequences of data;
a communication link configured for transmitting to the plurality of receivers of GNSS positioning signals at least one of the RTK, RTIGS and collaborative atmospheric errors/corrections with their associated metrics of a confidence level.

18. A receiver of GNSS positioning signals, comprising:
a plurality of signal processing channels configured for processing signals received from a plurality of satellites in GNSS constellations;
a memory with a first database storing data usable to calculate atmospheric errors/corrections applicable to the receiver from a combination of one or more atmospheric errors/corrections models;
computer logic configured for calculating said data usable to calculate atmospheric errors/corrections by:
when reference signals are available, said reference signals being one of multi-frequencies signals and single frequency signals aided by atmospheric errors/corrections received from a GNSS augmentation system, selecting the atmospheric errors/corrections model which outputs a position velocity and time, PVT, that is closest to the last PVT available from the reference signals;
when reference signals are not available but have been available less than a predefined time span before, using the last atmospheric errors/corrections model selected at the time reference signals were available;
when reference signals are not available and have not been available less than a predefined time span before,
selecting a predefined model stored in the first database, said selecting based on one or more of time or location of usage; or
filtering the one or more atmospheric errors/models to eliminate those that output PVT values outside a predefined confidence level and combining the models remaining at the output of the filtering.

19. The receiver of claim 18, wherein the local model is a combination of a plurality of ionospheric errors correction models comprising Kobluchar or NeQuick models.

20. The receiver of claim 18, wherein combining the models is done from a weighted average with corresponding weights.

21. The receiver of claim 20, wherein the corresponding weights are calculated dynamically as a function of one or more of confidence levels and quality indexes associated to the atmospheric errors/corrections models.

22. A system comprising:
a plurality of receivers of GNSS signals, wherein each of the plurality of receivers of GNSS signals comprises:
a plurality of signal processing channels configured for processing signals received from a plurality of satellites in GNSS constellations;
a memory with a first database storing data usable to calculate atmospheric errors/corrections applicable to the receiver from a combination of one or more atmospheric errors/corrections models;
computer logic configured for calculating said data usable to calculate atmospheric errors/corrections by:
when reference signals are available, said reference signals being one of multi-frequencies signals and single frequency signals aided by atmospheric errors/corrections received from a GNSS augmentation system, selecting the atmospheric errors/corrections model which outputs a position velocity and time, PVT, that is closest to the last PVT available from the reference signals;
when reference signals are not available but have been available less than a predefined time span before, using the last atmospheric errors/corrections model selected at the time reference signals were available;

when reference signals are not available and have not been available less than a predefined time span before, selecting a predefined model stored in the first database, said selecting based on one or more of time or location of usage; or filtering the one or more atmospheric errors/models to eliminate those that output PVT values outside a predefined confidence level and combining the models remaining at the output of the filtering; and a server comprising:

an interface configured to acquire at least one of Real Time Kinematics (RTK) and Real Time International GNSS Service (RTIGS) atmospheric errors/corrections and a metrics of a confidence level of said errors/corrections;

computer logic configured to determine a list of contributing receivers located in a plurality of geographic areas;

acquire at a predetermined frequency, timed sequences of data transmitted by the contributing receivers in the list, said timed sequences of data comprising:

Code and phase of a channel of each contributing receiver; and/or

A data computed thereof;

calculate timed sequences of collaborative atmospheric errors/corrections applicable in the plurality of geographic areas and a metrics of a confidence level of said errors/corrections from the timed sequences of data;

a communication link configured for transmitting to the plurality of receivers of GNSS positioning signals at least one of the RTK, RTIGS and collaborative atmospheric errors/corrections with their associated metrics of a confidence level.

* * * * *